May 10, 1927.

W. E. KEMPTON ET AL 1,627,975

AUTOMOBILE VISOR

Filed April 26, 1926

INVENTORS
William E. Kempton
BY John Rucker,
Geo. P. Kimmel ATTORNEY.

May 10, 1927.
W. E. KEMPTON ET AL
1,627,975
AUTOMOBILE VISOR
Filed April 26, 1926　　2 Sheets-Sheet 2
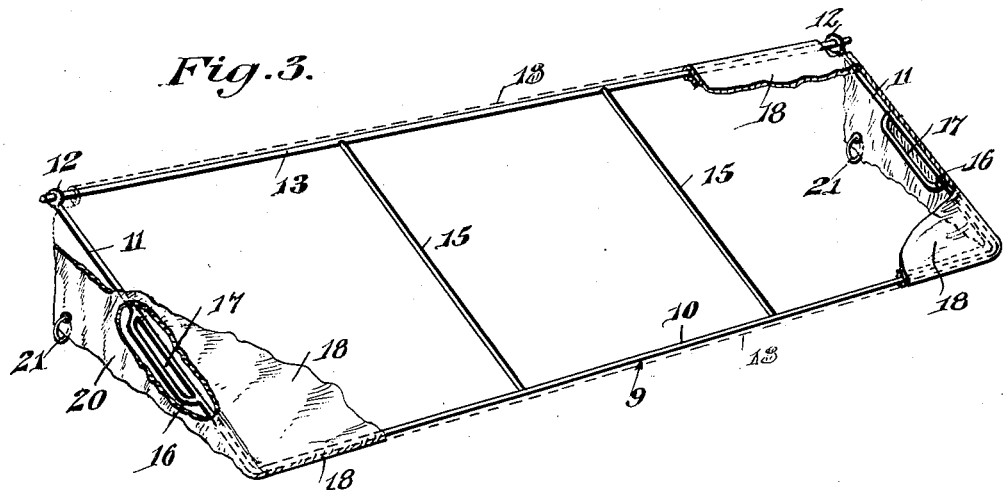
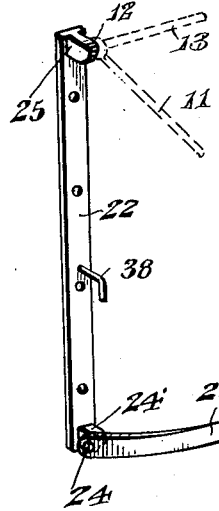
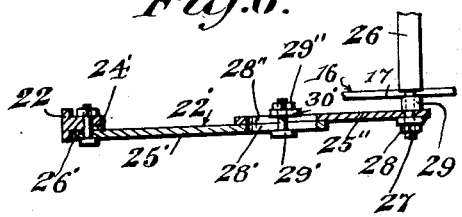
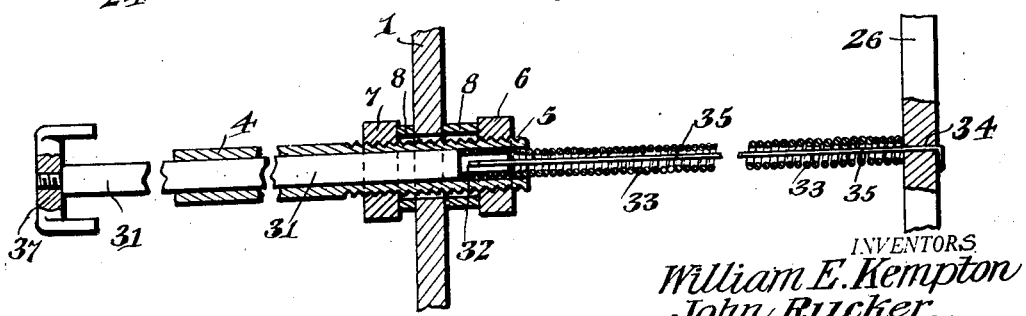
INVENTORS
William E. Kempton
John Rucker,
BY
Geo. P. Kimmel　ATTORNEY.

Patented May 10, 1927.

1,627,975

UNITED STATES PATENT OFFICE.

WILLIAM E. KEMPTON, OF MARSHALL, AND JOHN RUCKER, OF MORGAN, MINNESOTA.

AUTOMOBILE VISOR.

Application filed April 26, 1926. Serial No. 104,753.

This invention relates to a visor for use in connection with automobiles, and has for its object to provide, in a manner as hereinafter set forth, a visor capable of being adjustably positioned to protect the eyes of the driver of a vehicle, without shutting off the driver's vision of the road before him, from the blinding effects from the glare from the headlights of an approaching vehicle, from the sun rays and from snow and sand, as well as the effect of rain or snow striking the windshield of the vehicle.

Further objects of the invention are to provide, in a manner as hereinafter set forth, a visor for the purpose referred to, which is simple in its construction and arrangement, strong, durable, compact, readily installed with respect to an automobile, thoroughly efficient in its use, conveniently adjusted, and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to, which fall within the scope of the claims hereunto appended.

In the drawings wherein like reference characters denote corresponding parts throughout the several views:

Figure 3 is a fragmentary view, in perspective, of the visor body.

Figure 4 is a perspective view of one of the supporting brackets and further illustrating the shifting rod for the visor body.

Figure 5 is a fragmentary view, in lengthwise section of the adjusting means for the shifting rod.

Figure 6 is a sectional plan of a modified form of supporting bracket.

Figure 1:
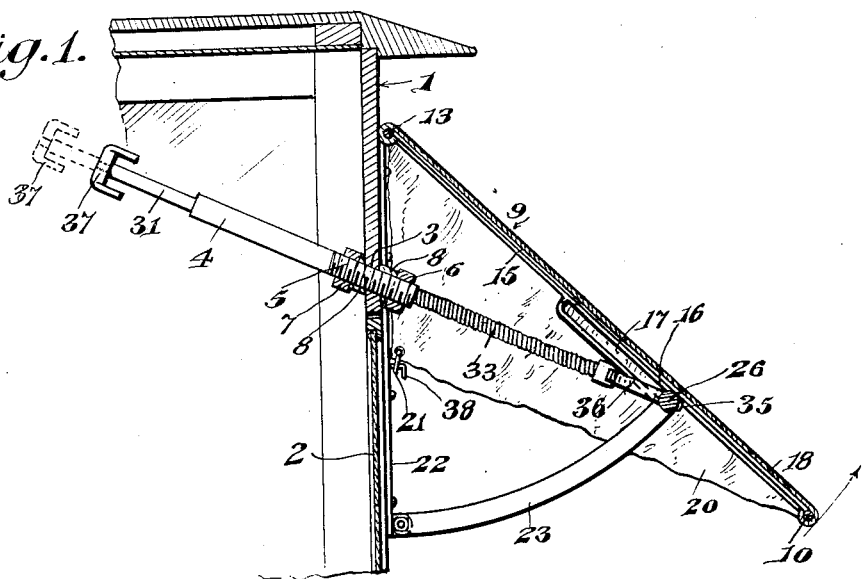
Figure 1 is a fragmentary view, in section, of the front of an automobile, showing the adaptation therewith of a visor in accordance with this invention, and further illustrating the visor in its lowered position in full lines.

Referring to the drawings in detail 1 denotes the front frame of an automobile and in which is arranged the windshield 2. The frame 1, at the top thereof, and in proximity to the windshield 2, is formed with an opening 3 through which extends a tubular member 4 providing means for slidably supporting an adjusting device for the shifting rod for the visor body. The adjusting device, shifting rod and visor body will be presently referred to. The tubular member 4 projects an appropriate distance forwardly and rearwardly of the frame 1, and is provided with peripheral threads 5 engaged by inner and outer clamping nuts 6 and 7 which abut against collars 8 for fixedly securing the tubular member 4 with the frame 1. The collars 8 abut against the inner and outer faces of the frame 1.

The visor body which is positioned forwardly with respect to the frame 1 and windshield 2 and is arranged above the latter comprises a frame 9, preferably of rectangular contour, and consisting of a U-shaped member 10, closed at its forward end and open at its rear end and having each of its arms 11 provided at the rear end thereof with an eye 12. Extending through the eyes 12 is a frame bar 13 of greater length than the length of the member 10 whereby the ends of the bar 13 will project laterally from the eyes 12. Extended from the bar 13 to the front of the member 10, as well as being connected therewith are spaced brace members 15. Each of the arms 11 of the member 10 has projecting downwardly therefrom an integral extension 16 having the major portion of its length spaced from its associated arm to form an elongated guide slot 17. The frame of the visor body has secured thereto a covering 18 which provides a shield. The covering 18 overlaps and depends from the ends of the frame of the visor body to form flexible flaps 20 provided with eyes 21 for detachably connecting the flaps to the sides of the front frame 1. The length of the flaps 20 is such as not to interfere with the adjustment of the visor body when elevating or lowering the same. The flaps 20 are substantially of triangular contour.

Secured to each side of the front frame 1, below the top of the latter, is a supporting bracket consisting of a vertically disposed arm 22 and a forwardly extending and upwardly curved arm 23 having its rear end pivotally connected, as at 24, to a lug 24' extended forwardly from the lower end of the arm 22.

Figure 2:
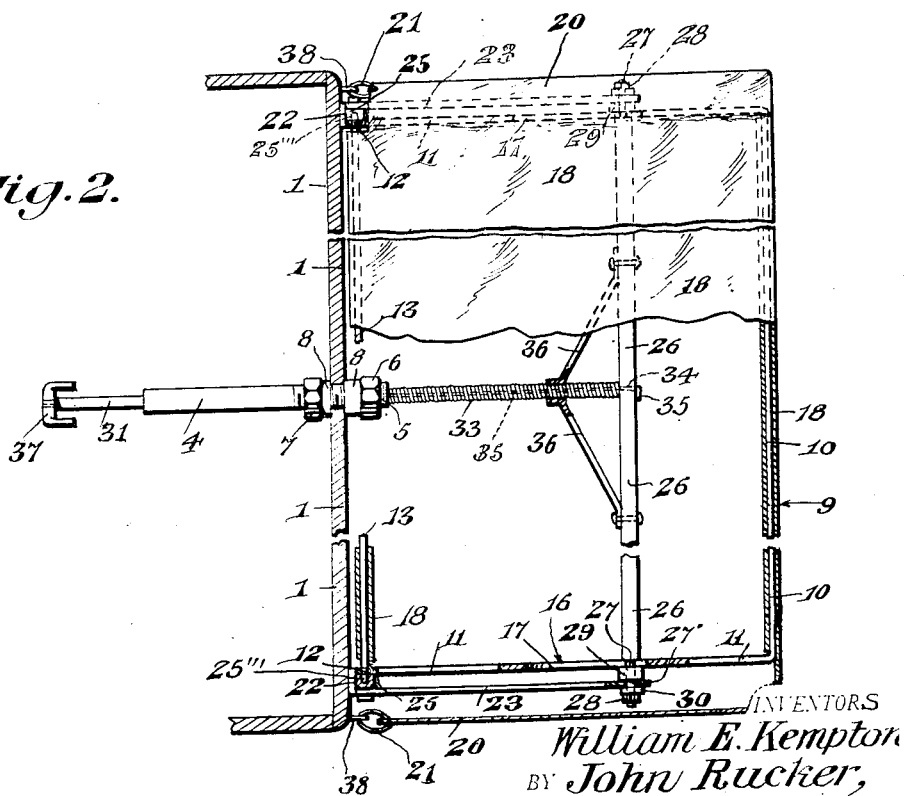
Figure 2 is a fragmentary view, in sectional plan, illustrating the front of an automobile and showing the adaptation therewith of a visor in accordance with this invention.

The upper end of the arm 22 is formed with a forwardly projecting lug 25 provided with a socket 25''' into which extends one of the ends of the frame bar 13, see Figure 2. The frame bar 13 pivots in the lugs 25 which are carried by the arm 22 and further connect the upper ends of the visor body with the front frame of the automobile.

Extending transversely with respect to the front frame of the automobile is a shifting rod 26 for the visor body and which has reduced terminal portions 27 through apertures 27' formed in the outer ends of the arms 23. The terminal portions 27 also extend through the guide slots 17. Nuts 28 have threaded engagement with the reduced terminal portions 27 of the rod 26. Mounted on the reduced terminal portions 27, and interposed between the arms 23 and the extensions 16 are collars 29. Washers are interposed between the nuts 28 and the arms 3 and said washers are indicated at 30. The arms 23 provide supports for the rod 26.

The adjusting means for the rod 26 is slidably mounted in the tubular member 4 and extends forwardly and rearwardly with respect thereto. The said adjusting means consists of a bodily shiftable sectional shaft connected to the rod 26, whereby when the shaft is moved inwardly or outwardly the rod 26 will be carried therewith thereby adjusting the position of the visor body. The shaft consists of an inner solid section 31 having a reduced forward terminal 32. The shaft further includes a flexible section 33 which is attached to the reduced terminal portion of the section 31 and abuts against the rod 26. Secured to the reduced terminal portion 32 of the section 31, extending through the section 33 and anchored as at 34 to the rod 26 is a flexible bar 35 of appropriate diameter and which preferably is a length of flexible wire. The rod 26 is also connected to the flexible shaft section 33 by a pair of oppositely extending brace members 36. By setting up the sectional shaft with the forward section of flexible type provision is made for bending the forward section of the shaft during the elevating and lowering or other adjusting of the visor body, see dotted line position, Figure 1. The section 31 of the shaft has its rear end provided with a handle member 37 to facilitate shifting of the adjusting shaft when occasion required.

The front frame 1 of the vehicle body has secured therewith forwardly extending hooks 38 which coact with the eyes 21 for maintaining the flaps 20 in a depending position.

Figure 6 of the drawing shows a modified construction of lower arm, of the supporting bracket as shown, and its construction is such to provide for the lengthwise adjustment of such arm so it can be employed with visor bodies of different widths. Referring to Figure 6, 22 indicates the vertical arm of the supporting bracket and 22' generally the lower arm thereof. The arm 22' is formed of two curved sections 25' and 25'', one forming a continuation of the arc of the other. The section 25' is the inner section of the arm 22' and has its inner end pivotally connected to the lug 24', on the arm 22, as at 26'. The section 25'' has extending through its outer end one of the reduced terminals 27 of the rod 26. The inner terminal portion of the section 25'' is formed with an arcuate slot 28' and the outer terminal portion of the section 25' is provided with an arcuate slot 28'' which opposes the slot 28'. Carried by the section 25' and extending through the slots 28' and 28'' is a headed bolt 29' provided with a nut 29'' and a washer 30'. The slots 28' and 28'' in connection with the bolt 29' and nut 29'' provide means for lengthwise adjusting the arm 22' and for maintaining the latter in adjusted position.

The connecting of the shifting rod, in the manner as referred to, with respect to the visor body, provides for the elevating and lowering of the latter when the adjusting shaft is shifted and owing to the construction of the shaft section 33 the visor body will be retained in the position to which it has been adjusted.

As the handle member 37 is positioned within convenient reach of the driver of the car, the driver can readily adjust the position of the visor body to protect his eyes during driving to overcome any blinding effects from the glare from oncoming headlights, or from the sun, and the adjustment can be had without interfering with the driver's vision of the road. The visor body is of sufficient width so as to protect the upper portion of the windshield from rain, sleet and snow.

It is thought that the many advantages of a visor, in accordance with this invention and for the purpose referred to, can be readily understood, and although the preferred construction of the device is as illustrated and described, yet it is to be understood that changes in the details of contruction can be had which will fall within the scope of the invention as claimed.

What we claim is:

1. A visor for automobiles comprising an adjustable visor body, an adjusting rod therefor extending lengthwise thereof and further slidably connected with the ends of the visor body, supporting means for said visor body and rod, and a lengthwise shiftable adjusting element for said rod, said element having a rigid rear portion and a flexible outer portion connected to said rod centrally thereof.

2. A visor for automobiles comprising an adjustable visor body, an adjusting rod therefor extending lengthwise thereof and further slidably connected with the ends of the visor body, supporting means for said visor body and rod, a lengthwise shiftable adjusting element for said rod, said element having a rigid rear portion and a flexible outer portion connected to said rod centrally thereof, and a fixed tubular member arranged rearwardly of the visor body and providing means for slidably supporting said element.

3. A visor for automobiles comprising a pair of spaced supporting brackets adapted to be fixed to the front of the automobile body, a visor body having its rear pivotally mounted in said brackets, an adjusting rod for and extending lengthwise of the visor body, said rod having its ends slidably connected to the ends of said visor body and shiftably supported by said brackets, and a lengthwise shiftable means slidably supported in the front of the automobile body and having its forward end fixed to said rod centrally of the latter and providing means for shifting the rod to adjust the visor body.

4. A visor for automobiles comprising a pair of spaced supporting brackets adapted to be fixed to the front of the automobile body, a visor body having its rear pivotally mounted in said brackets, an adjusting rod for and extending lengthwise of the visor body, said rod having its ends slidably connected to the ends of said visor body and shiftably supported by said brackets, a lengthwise shiftable means slidably supported in the front of the automobile body and having its forward end fixed to said rod centrally of the latter and providing means for shifting the rod to adjust the visor body, and said shiftable element having its forward portion in the form of a flexible shaft.

5. A visor for automobiles comprising an adjustable visor body, an adjusting rod therefor, said rod extending lengthwise of said visor body, means for supporting said visor body and rod, and a lengthwise shiftable adjusting element for said rod, said element having a rigid rear portion and a flexible outer portion connected to said rod centrally thereof, and a stationary tubular member for slidably supporting the rigid rear portion of said element.

6. A visor for automobiles comprising an adjustable visor body, an adjusting rod therefore extending lengthwise thereof, said rod having its ends slidably supported by the ends of said visor body, supporting means for said visor body and rod, a lengthwise shiftable adjusting element for said rod, said element having a flexible outer portion connected to said rod centrally thereof, and bracing means between said rod and said flexible outer portion of said element.

7. A visor for automobiles comprising an adjustable visor body, an adjusting rod therefor extending lengthwise thereof, said visor body provided with means at its ends for slidably supporting said rod in proximity to the ends of the latter, supporting means for said visor body and rod, said supporting means connected with the ends of the visor body and the ends of said rod, and an adjustable element for said rod, said element having a rigid rear portion and a flexible outer portion connected to said rod centrally thereof.

8. A visor for automobiles comprising an adjustable visor body, an adjusting rod therefor extending lengthwise thereof, said visor body provided with means at its ends for slidably supporting said rod in proximity to the ends of the latter, supporting means for said visor body and rod, said supporting means connected with the ends of the visor body and the ends of said rod, an adjustable element for said rod, said element having a rigid rear portion and a flexible outer portion connected to said rod centrally thereof, and a stationary tubular member for slidably supporting the rigid rear portion of said adjusting element.

In testimony whereof, we affix our signatures hereto.

WILLIAM E. KEMPTON.
JOHN RUCKER.